US011381946B2

United States Patent
Song et al.

(10) Patent No.: US 11,381,946 B2
(45) Date of Patent: Jul. 5, 2022

(54) METHOD AND APPARATUS FOR EDGE TRANSFER BASED ON MOVEMENT OF USER DEVICE

(71) Applicants: Hyundai Motor Company, Seoul (KR); Kia Motors Corporation, Seoul (KR)

(72) Inventors: Jae Seung Song, Seoul (KR); Young Jin Na, Gyeonggi do (KR); Min Byeong Lee, Gyeonggi do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/881,730

(22) Filed: May 22, 2020

(65) Prior Publication Data

US 2020/0374677 A1 Nov. 26, 2020

Related U.S. Application Data

(60) Provisional application No. 62/851,729, filed on May 23, 2019.

(51) Int. Cl.
*H04W 4/00* (2018.01)
*H04W 4/70* (2018.01)
*H04W 36/32* (2009.01)

(52) U.S. Cl.
CPC ............. *H04W 4/70* (2018.02); *H04W 36/32* (2013.01)

(58) Field of Classification Search
CPC ................................ H04W 4/70; H04W 36/32
USPC ........................................................ 370/331
See application file for complete search history.

(56) References Cited

U.S. PATENT DOCUMENTS

| | | | | |
|---|---|---|---|---|
| 2005/0232212 A1* | 10/2005 | Kang | ................ | H04W 36/0061 370/338 |
| 2011/0213871 A1* | 9/2011 | DiGirolamo | ............ | H04W 4/70 709/223 |
| 2013/0010646 A1* | 1/2013 | Liu | .......................... | H04W 4/70 370/255 |
| 2013/0046821 A1* | 2/2013 | Alan | ...................... | H04W 76/27 709/204 |
| 2013/0058311 A1* | 3/2013 | Park | .................. | H04W 36/0033 370/331 |
| 2013/0148497 A1* | 6/2013 | Chan | ..................... | H04W 76/18 370/230 |

(Continued)

FOREIGN PATENT DOCUMENTS

DE     11 2016 004 118 T5     6/2018

OTHER PUBLICATIONS

ETSI "Mobile Edge Computing (MEC); Framework and Reference Architecture", ETSI GS MEC 003 V1.1.1, Mar. 2016, 18 pages.

(Continued)

*Primary Examiner* — Mark G. Pannell
(74) *Attorney, Agent, or Firm* — Fox Rothschild LLP

(57) ABSTRACT

A method and apparatus for providing an edge transfer according to the movement of a device are provided. The method includes receiving a handover decision and handover information from a network, when a device performs the handover and a network function virtualization instance of the source edge is transferred to the target edge. The method then transfers an M2M service instance of the source edge to an M2M edge node.

8 Claims, 13 Drawing Sheets

(56) References Cited

U.S. PATENT DOCUMENTS

| | | | |
|---|---|---|---|
| 2014/0024385 A1* | 1/2014 | Kawasaki | H04W 48/16 |
| | | | 455/450 |
| 2014/0274066 A1* | 9/2014 | Fodor | H04W 24/02 |
| | | | 455/437 |
| 2018/0014339 A1* | 1/2018 | Baek | H04W 68/005 |
| 2018/0124771 A1* | 5/2018 | Mok | H04W 36/0072 |
| 2018/0139665 A1* | 5/2018 | Park | H04W 36/0005 |
| 2018/0160342 A1* | 6/2018 | Park | H04W 36/0007 |
| 2018/0206089 A1* | 7/2018 | Cavalcanti | H04W 36/00837 |

OTHER PUBLICATIONS

Sabella, et al., "Mobile-Edge Computing Architecture", IEEE Consumer Electronics Magazine, Sep. 22, 2016, 84-91.

Taleb, et al., "On Multi-Access Edge Computing: A Survey of the Emerging 5G Network Edge Cloud Architecture and Orchestratio", IEEE Communications Surveys & Tutorials, May 2017, 19(3):25 pages.

* cited by examiner

METHOD AND APPARATUS FOR EDGE TRANSFER BASED ON MOVEMENT OF USER DEVICE

CROSS REFERENCE TO RELATED APPLICATION

The present application claims priority to a U.S. provisional application 62/851,729, filed May 23, 2019, the entire contents of which are incorporated herein for all purposes by this reference.

BACKGROUND OF THE INVENTION

Field of the Invention

The present invention relates to a method and apparatus for edge transfer when a handover occurs according to the movement of a user device in a machine-to-machine (M2M) system, and more particularly, to a method and apparatus for stably transferring an edge instance to a target edge in an M2M system.

Description of the Related Art

Recently, introduction of Machine-to-Machine (M2M) system has become active. M2M communication refers to a communication executed between machines without human intervention. M2M may refer to Machine Type Communication (MTC), Internet of Things (IoT) or Device-to-Device (D2D). In the following description, the term "M2M" is uniformly used for convenience of explanation, but the present invention is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the one M2M standardization organization provides requirements for M2M communication, things to things communication and IoT technology, and technologies for architecture, Application Program Interface (API) specifications, security solutions and interoperability. The specifications of the one M2M standardization organization provide a framework to support a variety of applications and services such as smart cities, smart grids, connected cars, home automation, security and health.

SUMMARY

The present invention provides a method and device for rendering a stable service to a user device by transferring an edge instance to a target base station, when a handover occurs according to the movement of the user device in a machine-to-machine (M2M) system.

According to the present invention, a method for operating an M2M apparatus in a machine-to-machine system may include receiving a handover decision and handover information from a network when a network function virtualization instance of a source edge is transferred to a target edge, transferring an M2M service instance of the source edge to an M2M edge node.

According to the present invention, an M2M apparatus may include a transceiver configured to transmit and receive data and a processor configured to operate the transceiver. When a handover of a device occurs, the processor may be configured to receive information regarding the handover. When a network function virtualization of a source edge is transferred to a target edge, the processor may be configured to transfer an M2M service instance to an M2M edge node. Herein, the network function virtualization instance and the M2M service instance may be transferred either independently or non-independently based on a feature of the target edge.

Further, when the source edge and the target edge support 3GPP 5G, the target edge is the M2M edge node. When the source edge is an edge node supporting 3GPP 5G and the target edge is incapable of hosting the M2M service instance, the M2M edge node is searched for the M2M service instance transfer. Additionally, the M2M service instance includes an offloaded instance.

DETAILED DESCRIPTION

Figure 1:
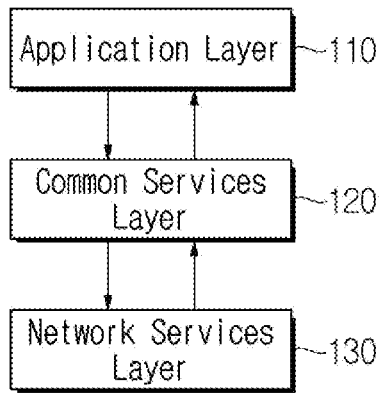
FIG. 1 is a view illustrating a layered structure of a Machine-to-Machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various embodiments are also included in the scope of the present disclosure.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In addition, the present specification describes a network based on Machine-to-Machine (M2M) communication, and a work in M2M communication network may be performed in a process of network control and data transmission in a system managing the communication network.

In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. In addition, an M2M server refers to a server for M2M communication and may be a fixed station or a mobile station. In addition, in the present specification, an entity may refer to hardware like M2M device, M2M gateway and M2M server. In addition, for example, an entity may be used to refer to software configuration in a layered structure of M2M system and is not limited to the embodiment described above. In addition, for example, the present invention mainly describes an M2M system but is not solely applied thereto.

In addition, an M2M server may be configured to perform communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other via an M2M gateway. Herein, for example, both an M2M gateway and an M2M server may be M2M terminals and are not limited to the exemplary embodiment described above.

Further, in the present disclosure, M2M service platform instance and M2M service instance may be used interchangeably. In the present disclosure, edge node and edge may be used interchangeably. Additionally, M2M terminal may be used interchangeably with M2M apparatus and M2M device. Further, in the present disclosure, a network function virtualization instance may be included in a network slice instance and may include all the instances that are capable of being arranged at an edge node. The concept of network function virtualization instance may include a network slice subnet instance.

Additionally, one M2M is a de facto standards organization that was founded to develop a communal IoT service platform sharing and integrating application service infrastructure (platform) environments beyond fragmented service platform development structures limited to separate industries like energy, transportation, national defense and public service.one M2M aims to render requirements for things to things communication and IoT technology, architectures, Application Program Interface (API) specifications, security solutions and interoperability. For example, the specifications of one M2M provide a framework to support a variety of applications and services such as smart cities, smart grids, connected cars, home automation, security and health. In this regard, one M2M has developed a set of standards defining a single horizontal platform for data exchange and sharing among all the applications. Applications across different industrial sections may also be considered by one M2M. Similar to an operating system, one M2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer that operates based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer configured to provide common services like data management, device management, M2M service subscription management and location service. For example, an entity operating based on the common services layer 120 may be a common service entity (CSE). The common services layer 120 may be configured to provide a set of services that are grouped into CSFs according to functions. A multiplicity of instantiated CSFs constitutes CSEs. CSEs may interface with applications (e.g., application entities or AEs in the terminology of one M2M), other CSEs and base networks (e.g., network service entities or NSEs in the terminology of one M2M). The network services layer 130 may be configured to provide the common services layer 120 with services such as device management, location service and device triggering. Herein, an entity operating based on the network layer 120 may be a network service entity (NSE).

Figure 2:
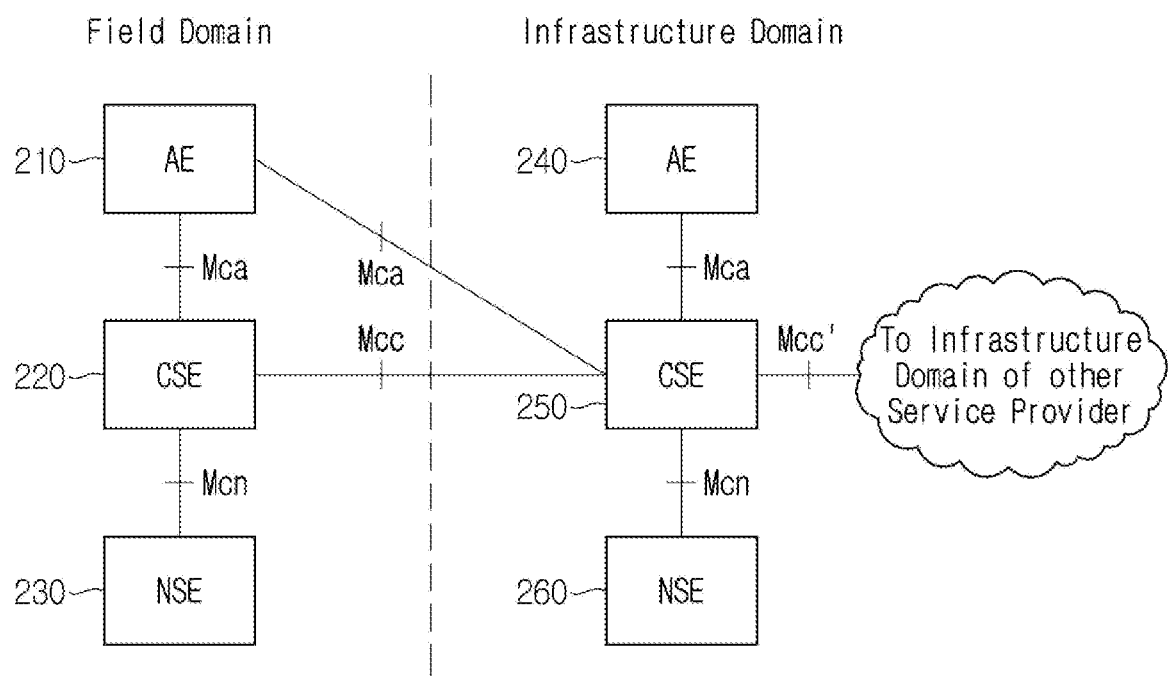
FIG. 2 is a view illustrating reference points in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may be configured to perform communication through a reference point (e.g., Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
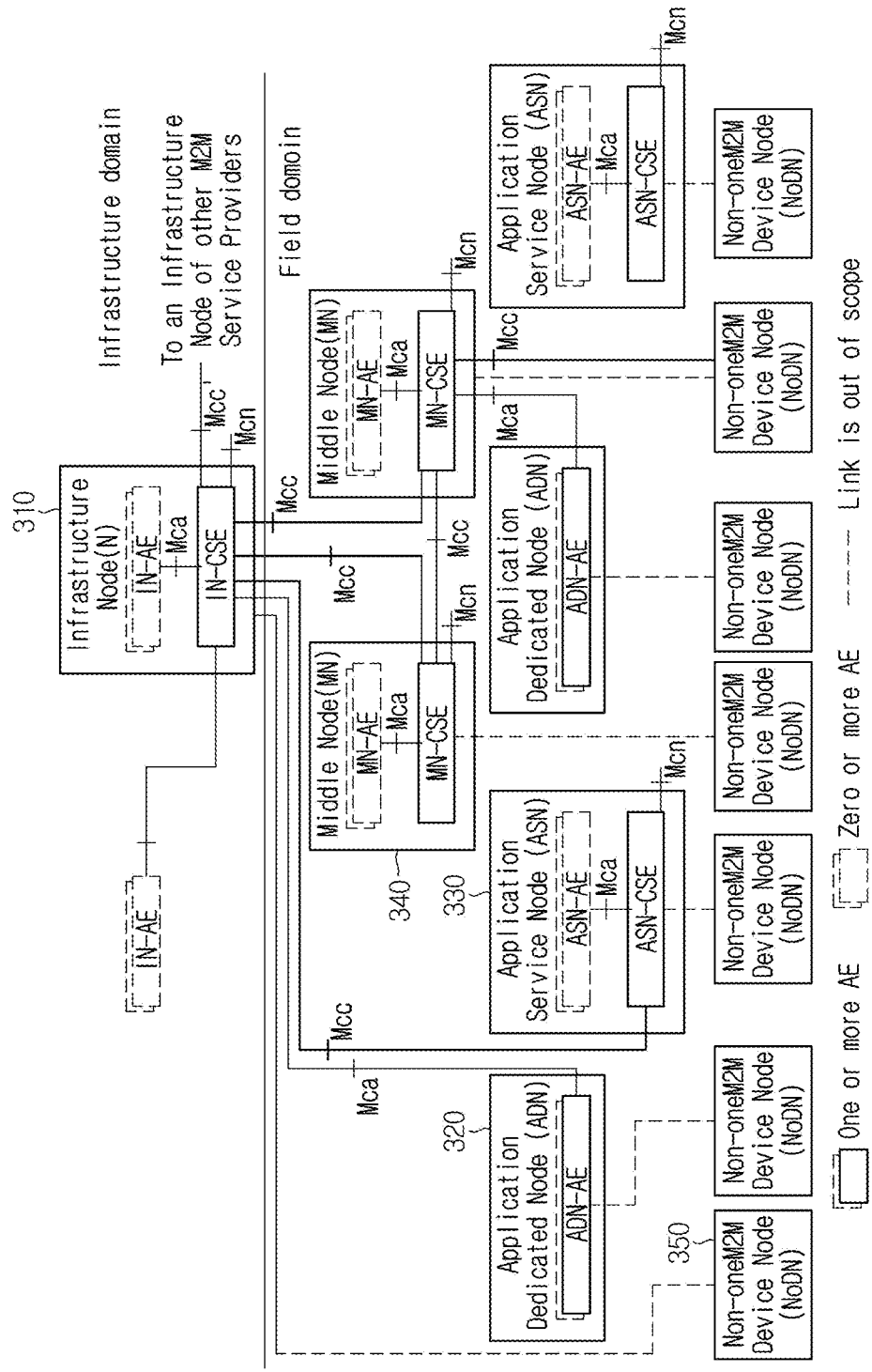
FIG. 3 is a view illustrating each node in an M2M system according to the present disclosure.

FIG. 3 is a view illustrating each node in an M2M system according to the present disclosure. Referring to FIG. 3, an infrastructure domain of a specific M2M service provider may be configured to provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node configured to perform communication with the M2M terminal of another infrastructure based on an infrastructure structure. In addition, for example, conceptually, a node may be a logical entity or a software configuration.

Furthermore, an application dedicated node (ADN) 320 may be a node including at least one AE but not CSE. Here, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. Particularly, the MN may be set in the field domain. An MN may be connected to another MN or IN based on a reference point. In addition, for example, an MN may be set in an M2M gateway in hardware. In addition, as an example, a non-M2M terminal node 350 (Non-M2M device node, NoDN) is a node that does not include M2M entities. It may be a node that performs management or collaboration together with an M2M system.

Figure 4:
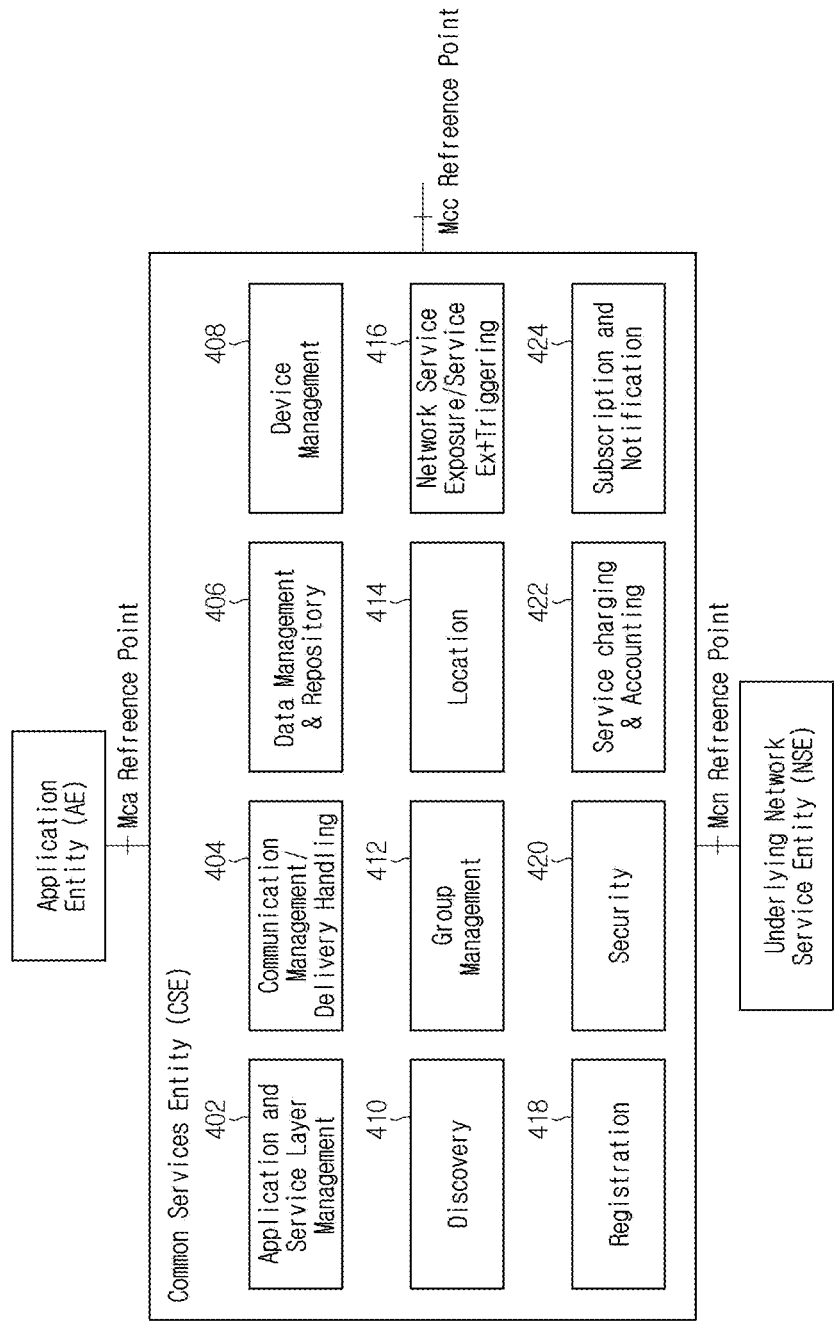
FIG. 4 is a view illustrating a common service function in an M2M system according to the present disclosure.

FIG. 4 is a view illustrating a common service function in an M2M system according to the present disclosure. Referring to FIG. 4, common service functions may be provided. For example, a common service entity may be configured to provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may be configured to operate based on a common service function. In addition, a common service function may be possible in other exemplary embodiments and is not limited to the above-described exemplary embodiment.

The application and service layer management 402 CSF may be configured to provide management of AEs and CSEs. The application and service layer management 402 CSF includes the configuring, problem solving and upgrading of CSE functions and also the capability of upgrading AEs. The communication management and delivery handling 404 CSF may be configured to provide communications with other CSEs, AEs and NSEs. The communication management and delivery handling 404 CSF may be configured to determine at what time and through what connection communications are to be delivered, and determine to buffer communication requests so that the communications may be delivered later, if necessary and permitted.

The data management and repository 406 CSF may be configured to provide data storage and transmission functions (e.g., data collection for aggregation, data reformatting, and data storage for analysis and sematic processing). The device management 408 CSF may be configured to provide the management of device capabilities in M2M gateways and M2M devices. The discovery 410 CSF may be configured to provide an information retrieval function for applications and services based on filter criteria.

The group management 412 CSF may be configured to provide processing of group-related requests. The group management 412 CSF enables an M2M system to support bulk operations for many devices and applications. The location 414 CSF may be configured to provide a function of enabling AEs to obtain geographical location information. The network service exposure/service execution and triggering 416 CSF may be configured to manage communications with base networks for access to network service functions.

The registration 418 CSF may be configured to register AEs (or other remote CSEs) to a CSE. The registration 418 CSF allows AEs (or remote CSE) to use services of CSE. The security 420 CSF may be configured to provide a service layer with security functions like access control including identification, authentication and permission. The service charging and accounting 422 CSF may be configured to provide charging functions for a service layer. The subscription/notification 424 CSF may be configured to provide a function of allowing subscription to an event and notifying the occurrence of the event.

Figure 5:
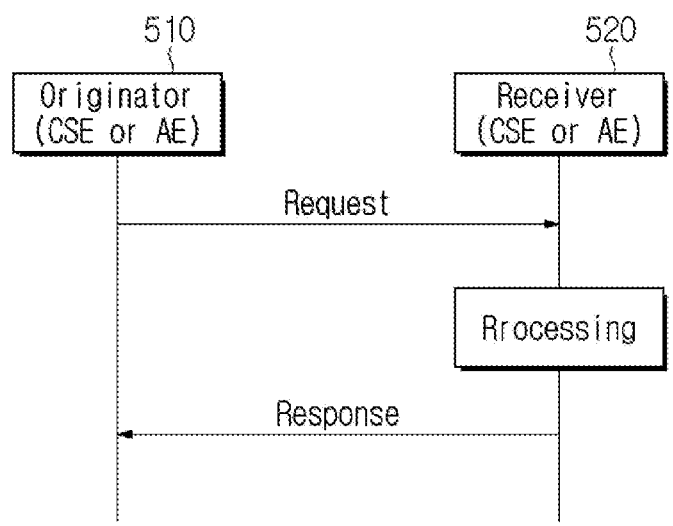
FIG. 5 is a view illustrating that an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. In addition, an identification parameter may be a parameter required for identification of each other.

An operation parameter may be a parameter for distinguishing operations. For example, an operation parameter may be set to any one among Create, Retrieve, Update, Delete and Notify. In other words, the parameter may aim to distinguish operations. Particularly, when receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, if a parameter is valid and authorized, the receiver 520 may be configured to check whether there is a requested resource and perform processing accordingly.

For example, when an event occurs, the originator 510 may be configured to transmit a request message including a parameter for notification to the receiver 520. The receiver 520 may be configured to check a parameter for a notification included in a request message and perform an operation accordingly. The receiver 520 may be configured to transmit a response message to the originator 510. A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code - successful, unsuccessful, ack
Request Identifier - uniquely identifies a Request message
Content - to be transferred
To - the identifier of the Originator or the Transit CSE that sent the corresponding non-blocking request
From - the identifier of the Receiver
Originating Timestamp - when the message was built
Result Expiration Timestamp - when the message expires
Event Category - what event category shall be used for the response message
Content Status
Content Offset
Token Request Information
Assigned Token Identifiers
Authorization Signature Request Information
Release Version Indicator - the oneM2M release version that this response message conforms to A filter criteria condition, which can be used in a request message or a response message, may be defined as in Table 2 and Table 3 below.

TABLE 2

| Condition tag | Multiplicity | Description |
| --- | --- | --- |
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |

TABLE 2-continued

| Condition tag | Multiplicity | Description |
|---|---|---|
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value, ft also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentinfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |

TABLE 3-continued

| Condition tag | Multiplicity | Description |
|---|---|---|
| applyRelativePath | 0 . . . 1 | This attribute contains a resource tree relative path (e.g. ../tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

Request message parameter

| | |
|---|---|
| Mandatory | Operation - operation to be executed/CREAT, Retrieve, Update, Delete, Notify<br>To - the address of the target resource on the target CSE<br>From - the identifier of the message Originator<br>Request Identifier - uniquely identifies a Request message |
| Operation dependent | Content - to be transferred<br>Resource Type - of resource to be created |
| Optional | Originating Timestamp - when the message was built<br>Request Expiration Timestamp - when the request message expires<br>Result Expiration Timestamp - when the result message expires<br>Operational Execution Time - the time when the specified operation is to be executed by the target CSE<br>Response Type - type of response that shall be sent to the Originator<br>Result Persistence - the duration for which the reference containing the responses is to persist<br>Result Content - the expected components of the result<br>Event Category - indicates how and when the system should deliver the message<br>Delivery Aggregation - aggregation of requests to the same target CSE is to be used<br>Group Request Identifier - Identifier added to the group request that is to be fanned out to each member of the group<br>Group Request Target Members-indicates subset of members of a group<br>Filter Criteria - conditions for filtered retrieve operation<br>Desired Identifier Result Type - format of resource identifiers returned<br>Token Request Indicator - indicating that the Originator may attempt Token Request procedure (for Dynamic Authorization) if initiated by the Receiver<br>Tokens - for use in dynamic authorization<br>Token IDs - for use in dynamic authorization<br>Role IDs - for use in role based access control<br>Local Token IDs - for use in dynamic authorization<br>Authorization Signature Indicator - for use in Authorization Relationship Mapping<br>Authorization Signature - for use in Authorization Relationship Mapping<br>Authorization Relationship Indicator - for use in Authorization Relationship Mapping<br>Semantic Query Indicator - for use in semantic queries<br>Release Version Indicator - the oneM2M release version that this request message conforms to.<br>Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE.

An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

In order to support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Resources may be specified in associated to CSE. Resources are representation of component and element in CSE at one M2M system. Other CSEs, AEs, application data for sensor and commands are notified to CSE as mean of resource representation. A resource is an entity that is uniquely addressable in one M2M architecture. Resource is delivered and may be manipulated by CRUD(Create Retrieve Update Delete) operation.

A child resource is a sub-resource of the parent resource. The parent resource may include the reference to at least one child resource. An attribute may contain the information of resource. The set of attributes is not listed within the graphical representation of the resource, unless common to all resources. An attribute may be distinguished as universal attribute, common attribute and resource-specific attribute. The universal attribute is an attribute that appears on all resources. The common attribute is an attribute that appears on multiple resources and has the same meaning wherever it appears.

Table 5 may show the examples of the attributes that are virtual or not announced, general and universal on all resources.

TABLE 5

| Attribute Name | Description |
| --- | --- |
| resourceType | Resource Type. This Read Only (assigned at creation time, and then cannot be changed) attribute identifies the type of the resource as specified in clause 9.6. Each resource shall have a resourceType attribute. |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1. This attribute shall be provided by the Hosting CSE when it accepts a resource creation procedure. The Hosting CSE shall assign a resourceID which is unique in that CSE. |
| resourceName | This attribute is the name for the resource that is used for 'hierarchical addressing method' to represent the parent-child relationships of resources. See clause 7.2 for more details. This attribute may be provided by the resource creator. The Hosting CSE shall use a provided resourceName as long as it does not already exist among child resources of the targeted parent resource. If the resourceName already exists, the Hosting CSE shall reject the request and return an error to the Originator. The Hosting CSE shall assign a resourceName if one is not provided by the resource creator. |
| parentID | This attribute is the resourceID of the parent of this resource. The value of this attribute shall be NULL for the <CSEBase> resource type. |
| creationTime | Time/date of creation of the resource. This attribute is mandatory for all resources and the value is assigned by the system at the time when the resource is locally created. Such an attribute cannot be changed. |
| lastModifiedTime | Last modification time/date of the resource. The lastModifiedTime value is set by the Hosting CSE when the resource is created, and the lastModifiedTime value is updated when the resource is updated. |

Table 6 shows examples of attributes that are commonly used in a plurality of resource types (but, not all resource types) that are virtual or not announced.

TABLE 6

| Attribute Name | Description |
| --- | --- |
| accessControlPolicyIDs | The attribute contains a list of identifiers for <accessControlPolicy> resources. The privileges defined in the <accessControlPolicy> resources that are referenced determine who is allowed to access the resource containing this attribute for a specific purpose (e.g. Retrieve, Update, Delete, etc.).<br>For an Update or Delete operation to a resource, the update or delete of the accessControlPolicyIDs attribute, if applicable, shall be performed prior to the update or delete of any other attributes of the resource.<br>To update this attribute, a Hosting CSE shall check whether an Originator has Update privilege in any selfPrivileges, regardless of privileges, of the <accessControlPolicy> resources which this attribute originally references.<br>After successful update of the accessControlPolicyIDs attribute, resource access checking for other attributes to be updated shall use the new privileges defined in the <accessControlPolicy> resource(s) that are referenced by the newly updated accessControlPolicyIDs attribute.<br>Similarly, to delete this attribute, a Hosting CSE shall check whether an Originator has Updateprivilege in any selfPrivileges, regardless of privileges, of the <accessControlPolicy> resources which this attribute originally references.<br>After successful deletion of the accessControlPolicyIDs attribute, resource access checking for other attributes to be deleted shall use the default access privileges as described in the following paragraphs.<br>If a resource type does not have an accessControlPolicyIDs attribute definition, then the accessControlPolicyIDs for that resource is governed in a different way, for example, the accessControlPolicy associated with the parent may apply to a child resource that does not have an accessControlPolicyIDs attribute definition, or the privileges for access are fixed by the system. Refer to the corresponding resource type definitions and procedures to see how access control is handled in such cases.<br>If a resource type does have an accessControlPolicyIDs attribute definition, but the (optional) accessControlPolicyIDs attribute value is not set in a resource instance, then the Hosting CSE shall apply the concept of the default access policy. The default policy shall provide unrestricted access only to the Originator of the successful resource creation request. All other entities shall be denied to access the resource. For that purpose, the Hosting CSE shall keep that Originator information of the resource. Note that how to keep that information is implementation specific.<br>The default access policy is not applied to a resource which has a value assigned to |

TABLE 6-continued

| Attribute Name | Description |
| --- | --- |
| | the accessControlPolicyIDs attribute.<br>All resources are accessible if and only if the privileges (i.e. configured as privileges or selfPrivileges attribute of <accessControlPolicy> resource) allow it, therefore all resources shall have an associated accessControlPolicyIDs attribute, either explicitly (setting the attribute in the resource itself) or implicitly (either by using the parent privileges or the system default policies). Which means that the system shall provide default access privileges in case that the Originator does not provide a specific accessControlPolicyIDs during the creation of the resource. |
| expirationTime | Time/date after which the resource will be deleted by the Hosting CSE. This attribute can be provided by the Originator, and in such a case it will be regarded as a hint to the Hosting CSE on the lifetime of the resource. The Hosting CSE shall configure the expirationTime value. If the Hosting CSE configures the new expirationTime attribute value rather than the Originator suggested value, the new value can be sent back to the Originator depending on the Result Content value. The lifetime of the resource can be extended by providing a new value for this attribute in an UPDATE operation. Or by deleting the attribute value, e.g. by updating the attribute with NULL when doing a full UPDATE, in which case the Hosting CSE can decide on a new value.<br>If the Originator does not provide a value in the CREATE operation the system shall assign an appropriate value depending on its local policies and/or M2M service subscription agreements.<br>A resource is known as 'obsolete' when the resource contains the attribute "expirationTime" and the lifetime of this resource has reached the value of this attribute. If the 'obsolete' resource had a reference to an Application Entity Resource ID, the Hosting CSE shall send a NOTIFY request to the IN-CSE, requesting to delete the entry from the <AEContactList> resource. |
| stateTag | An incremental counter of modification on the resource. When a resource is created, this counter is set to 0, and it will be incremented on every modification of the resource (see notes 1 and 2). |
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26. For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(es), the present document does not provide any means for validating these address(es) for announcement purposes. It is the responsibility of the Hosting-CSE referenced by the resource address(s) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| labels | Tokens used to add meta-information to resources. This attribute is optional.<br>The value of the labels attribute is a list of individual labels, each of them being:<br>Either a standalone label-key, used as a simple "tag", that can be used for example for discovery purposes when looking for particular resources that one can "tag" using that label-key<br>Or a composite element made of a label-key and a label-value, separated by a special character defined in [3].<br>The list of allowed characters in a label (and in label-keys and label-values) and separator characters is defined in [3], clause 6.3.3. |
| e2eSecInfo | Present in a resource representing an AE or CSE. Indicates the end-to-end security capabilities supported by the AE or CSE. May indicate supported end-to-end security frameworks. May also contains a certificate or credential identifier used by the AE or CSE. May include random values for use in end-to-end security protocols. The details of this attributes are described in oneM2M TS-0003 [2]. This attribute is optional and if not present it means that the represented entity does not support oneM2M end-to-end security procedures. |
| DynamicAuthorization-ConsultationIDs | This attribute contains a list of identifiers of <dynamicAuthorizationConsultation> resources. The information defined in a <dynamicAuthorizationConsultation> resource is used by a CSE for initiating consultation-based dynamic authorization requests.<br>Consultation-based dynamic authorization is only performed for a targeted resource if and only if it is linked to an enabled <dynamicAuthorizationConsultation> resource.<br>If the attribute is not set or has a value that does not correspond to a valid <dynamicAuthorizationConsultation> resource(s), or it refers to an <dynamicAuthorizationConsultation> resource(s) that is not reachable, then the dynamicAuthorizationConsultationIDs associated with the parent may apply to the child resource if present, or a system default <dynamicAuthorizationConsultation> may apply if present. |

The one M2M system may support an expiration timer for deleting resources from a hosting CSE after a certain amount of time/date. An IoT service having temporary access and characteristics may use an expiration timer. By the expiration timer, the resource may be deleted after a given time period. The AE resource of M2M system may additionally include <modifiedResource> as a resource, an attribute or a sub-resource according to the present disclosure. In this regard, a further detailed description will be provided in FIG. 8.

Figure 6:
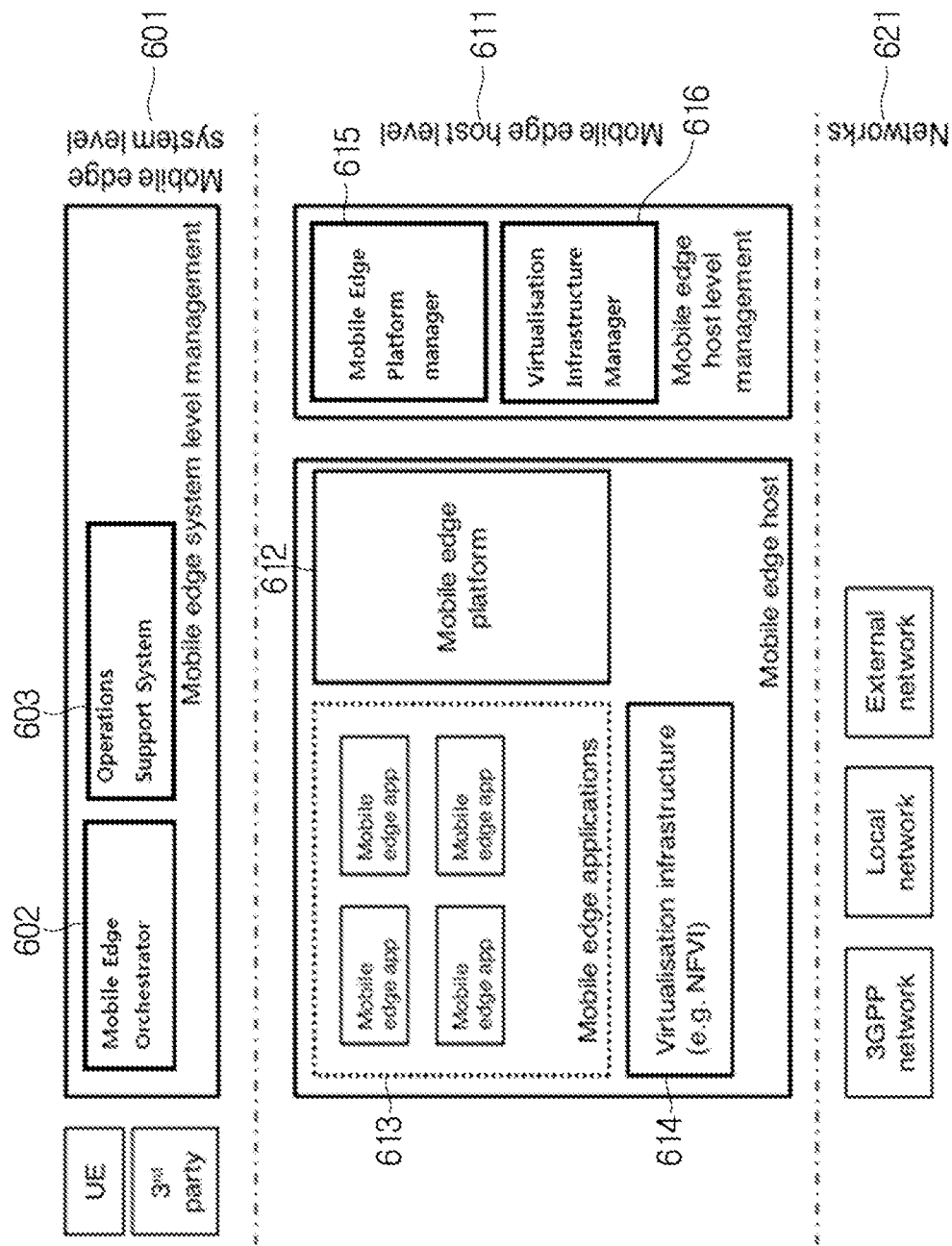
FIG. 6 is a view illustrating a mobile edge computing (MEC) framework according to the present disclosure.

FIG. 6 is a view illustrating a mobile edge computing (MEC) framework according to the present disclosure. The MEC framework may include basic entities for hosting a mobile edge application and may be distinguished into a mobile edge system level 601, a mobile edge host level 611 and a network level 621. In one exemplary embodiment, the mobile edge system level 601 may include a device (e.g., a user equipment, UE), a third party and a mobile edge system level management. The mobile edge system level management may include a mobile edge orchestrator 602 and an operations support system 603.

The mobile edge orchestrator 602 is the core component of the mobile edge system level. It maintains an overview of the mobile edge system, on-boards of application packages, validates application rules and requirements, triggers application instantiation and termination, and selects appropriate mobile edge host(s). The operations support system 603 may be configured to receive requests via the CFS (Customer Facing Service portal) portal and from UE (device) applications for instantiation or termination of applications and communicate with the Mobile edge orchestrator via Mm1 reference point for further processing.

In one exemplary embodiment, the mobile edge host level 611 may include a mobile edge host and a mobile edge host level management. The mobile edge host may include a mobile edge platform 612, a mobile edge application (app) 613 and a virtualization infrastructure 614. In addition, the mobile edge host level management may include a mobile edge platform manager 615 and a virtualization infrastructure manager 616. The mobile edge platform 612 is the collection of essential functionality required to run Mobile edge applications and enable them to discover, advertise, consume, and offer mobile edge services via Mp1 reference point. It also communicates other Mobile edge host through the Mp3 reference when supported.

The mobile edge applications run as the virtual machines (VM) of the Mobile edge host. The applications may be configured to interact with the Mobile edge platform to consume and provide mobile edge services via Mp1 reference point. The virtualization infrastructure may include a data plane that executes the traffic rules received by the mobile edge platform, and routes the traffic among applications, services, DNS server/proxy, 3GPP network, local networks and external networks. In addition, it may provide computing resources, storage and network resources.

The mobile edge platform manager 615 may be configured to manage the life cycle of applications, provide element management functions to the mobile edge platform and manages the application rules and requirements. Additionally, the mobile edge platform manager 615 may be configured to receive fault reports and performance measurements from the virtualization infrastructure manager. The virtualization infrastructure manager 616 may be configured to allocate, manage, and release the virtualized resources (e.g., compute, storage and networking) of the virtualization infrastructure via Mm7 reference point and collect and report performance and fault information regarding the virtualized resources.

Figure 7:
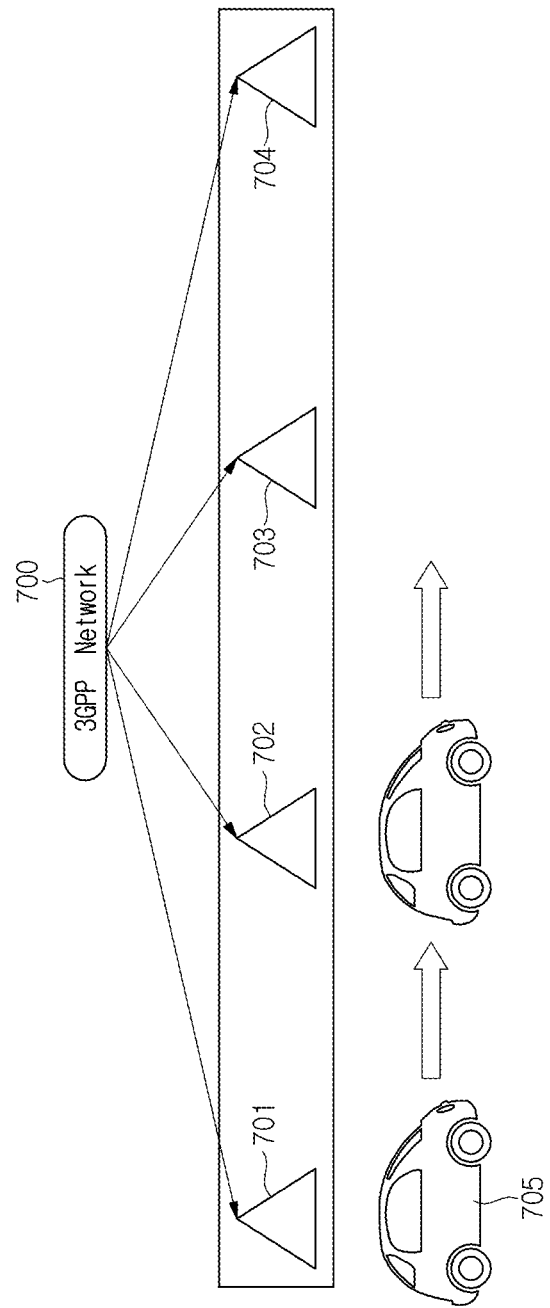
FIG. 7 and FIG. 8 are views illustrating an environment of edge transfer when the handover of a user device occurs in an M2M system, according to the present disclosure.
Figure 8:
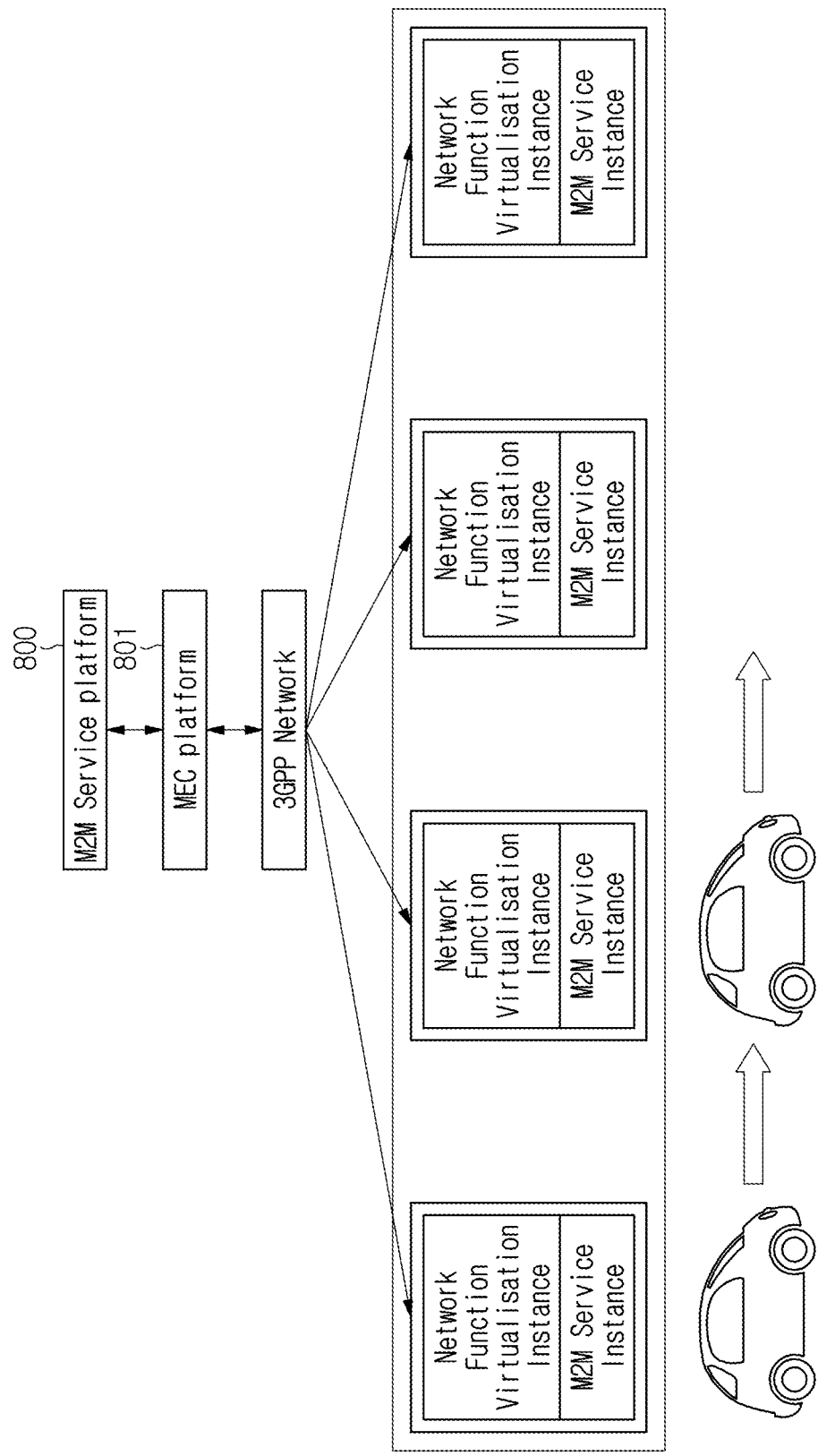

The network level 621 may include a 3GPP network, a local network, an external network, etc. An MEC platform based on the MEC framework may be included in the edge transfer environment of FIG. 7 to FIG. 8. FIG. 7 is a view schematically illustrating an edge transfer environment where an edge instance is transferred to a target edge in an M2M system according to the present disclosure. FIG. 8 is a view illustrating in further detail the edge transfer environment in an M2M system according to the present disclosure.

In one exemplary embodiment, the environment for edge transfer may include a 3GPP network 700. As shown in FIG. 8, an M2M service platform 800 and an MEC service platform 801 may further be included. In addition, at least one or more edge nodes 701, 702, 703 and 704 may be included, and at least one device 705 with mobility may be included.

In one exemplary embodiment, the 3GPP network 700 may be a core network that is devised in compliance with the standards proposed by 3GPP. It may support LTE and 5G. In addition, the 3GPP network 700 may include access network discovery and selection function (ANDSF), service capability exposure function (SCEF), and system architecture evolution gateway (SAE-GW). The 3GPP network 700 may be configured to notify a handover decision to a third party including an M2M service platform and support a polling channel and other means to provide handover information. Furthermore, the 3GPP network 700 may perform total management including session-based management and definition for an edge instance including an M2M service instance that is placed at an edge node and includes an offloaded instance.

Additionally, the at least one or more edge nodes 701, 702, 703 and 704 may be conventional edge nodes including router, access point and base stations such as eNB, gNB, en-gNB, etc. Meanwhile, the edge nodes may be used in a meaning including a fog node. In one exemplary embodiment, the device 705 is an apparatus that has mobility and may be connected to the Internet. For example, it may be a vehicle, a smart phone, etc.

Further, the M2M service platform 800 illustrated in FIG. 8 may refer to an M2M service central platform and include commonly required functions necessary for providing M2M services. Each service may be operated independently. In addition, the M2M service platform 800 may be configured to transfer M2M service instances between edge nodes and receive handover information from the 3GPP network. Further, in one exemplary embodiment, the M2M service platform 800 may be a service central platform according to oneM2M standards, search for an edge node and receive handover-related information from the 3GPP network.

Meanwhile, when an edge/fog instance is hosted to an edge node, an application entity (AE) of the M2M service platform may be configured to maintain additional information regarding what resource is updated as a resource. For example, whenever an edge/fog instance is updated, the M2M service platform may be configured to maintain information regarding what resource of the instance is updated in the resource <modifiedResource>. In addition, since such information may be used to transmit only a modified resource to a target edge/fog node, the efficiency of data communication may be enhanced. Thus, a moving device may be given the same service based on the same context at the target edge/fog node.

In one exemplary embodiment, an MEC service platform 801 may be designed according to the MEC framework illustrated in FIG. 6 and be involved in the mobile edge computing of an edge node. An edge transfer according to the present disclosure may be based on a handover from a source edge to a target edge, which may occur to provide a constant and stable service, when a device moves in an M2M system. In particular, the handover may be determined either by the device directly or by an entity of the 3GPP network 700. For example, the network entity may be ANDSF or SCEF but is not limited thereto.

Additionally, among the edge nodes 701, 702, 703 and 704, one edge 701 may be a source edge and another edge node 702 may be a target edge. Particularly, for example, the source edge and the target edge may be different base stations. The edge node 701 is assumed to be in a state of deploying various edge instances. In one exemplary embodiment, the edge node 701 may host service logic (e.g., machine learning, analytics) including a 3GPP network function virtualization instance and an instance that is offloaded from an M2M service platform. The edge node 701 may also host various edge instances like M2M service platform instances.

Herein, the offloaded instance may refer to an instance that is offloaded from the M2M service platform 800 or another edge node for smooth traffic processing. In particular, to stably provide a service to a device, when the handover of the device occurs, a 3GPP network function virtualization instance placed at a source edge may have to be transferred to another edge node 702 that is a target edge. The M2M service instances of the source edge may also be stably transferred based on information collected from the 3GPP core network.

Herein, if network function virtualization (NFV) or edge computing is possible, edge instances may be transferred to the target edge, that is, an edge node that is newly connected to a device. According to the present disclosure, when a handover occurs, an edge transfer may be performed according to tightly coupled edge mode or loosely coupled edge mode.

According to loosely coupled mode, in the case of an edge transfer, an M2M service instance and a network function virtualization instance accommodated (deployed) by a source base station may be independently transferred to a target edge node. In addition, it may include a case where a handover occurs from a 3GPP 5G edge node to another 3GPP 5G edge node and a case where a handover occurs from a 3GPP 5G edge node to a node incapable of hosting the M2M service instance. Particularly, the node incapable of hosting the M2M service instance may be a non-3GPP edge node. In this regard, a further detailed description will be provided in FIG. 9 to FIG. 14.

According to tightly coupled edge mode, both a network function virtualization instance and an M2M service instance may be considered as an edge instance and be non-independently transferred to a target edge node at the same time. In this regard, a further detailed description will be provided in FIG. 15.

Meanwhile, although an edge transfer according to the present disclosure may be implemented in various environments, hereinafter, for clarity of explanation, it may be assumed that a handover and an edge transfer occur in the environment of FIG. 7 and FIG. 8. However, the present disclosure is not limited thereto.

Figure 9:
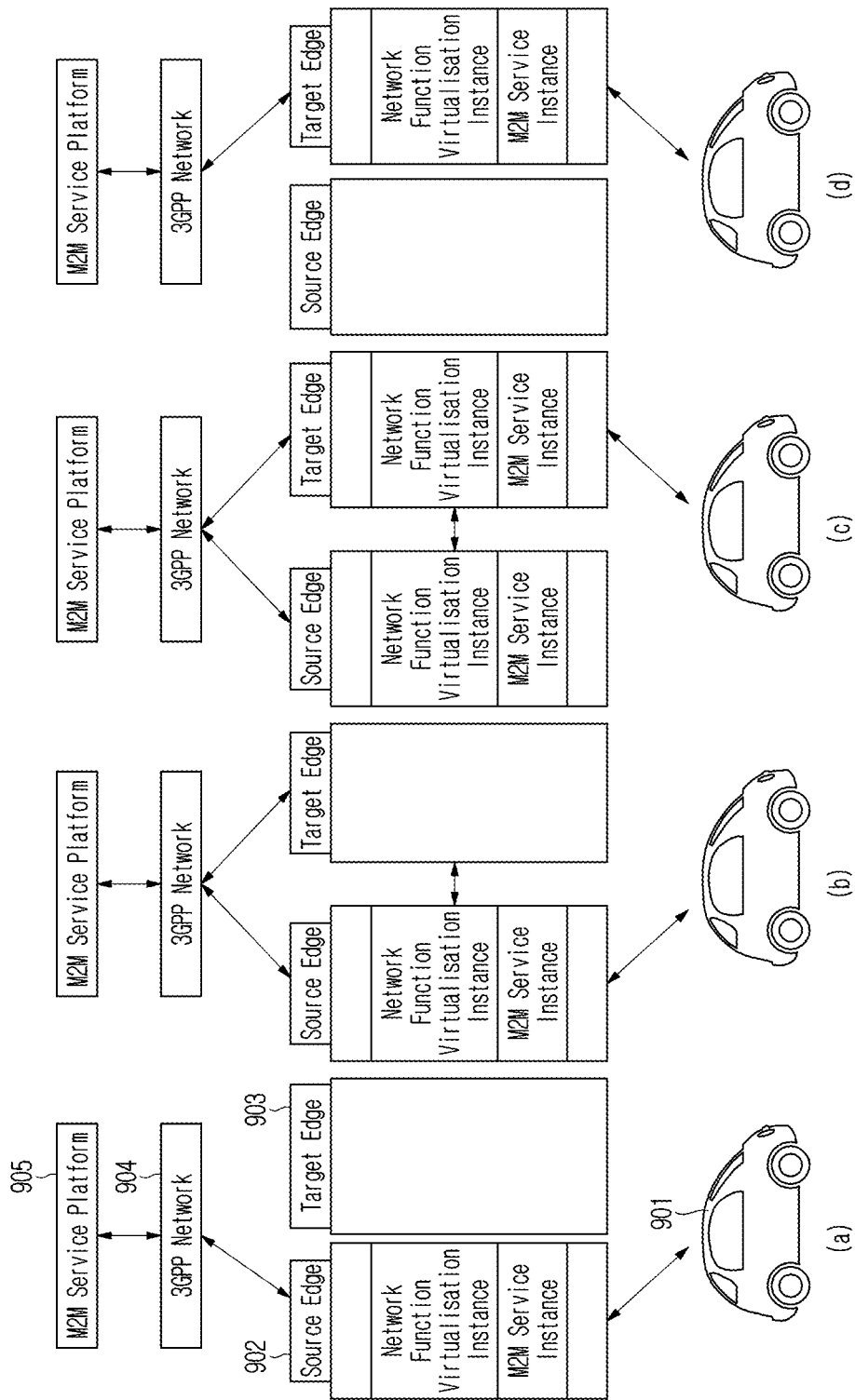
FIG. 9 is a view illustrating edge transfer in a loosely coupled edge mode in an M2M system according to the present disclosure.
Figure 10:
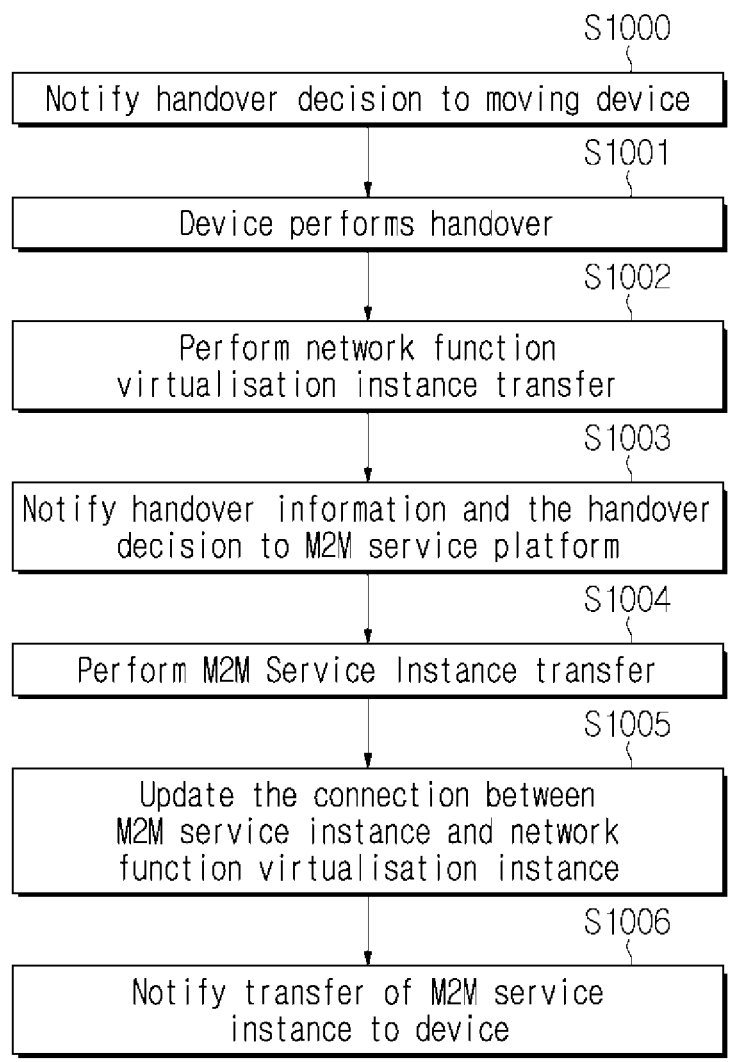
FIG. 10 to FIG. 12 are views illustrating each step of edge transfer process in a loosely coupled edge mode in an M2M system according to the present disclosure.

In one exemplary embodiment, to begin with, a source edge may be a 3GPP 5G edge node and a target edge may also be a 3GPP 5G edge node. FIG. 9 is a view illustrating a case where an edge transfer is performed in a loosely coupled edge mode in an M2M system according to the present disclosure. FIG. 10 is a view illustrating each step of edge transfer in an M2M system according to the present disclosure. More particularly, a network function virtualization instance of a source edge and an edge instance including an M2M service instance are transferred to a target edge independently of each other.

In one exemplary embodiment, an environment of edge transfer may include a device with mobility 901, a source edge 902, a target edge 903, a 3GPP network 904, and an M2M service platform 905. In addition, the 3GPP network may include elements like a service capability exposure function (SCEF), a system architecture evolution gateway (SAE-GW). A source edge may be a source base station, and a target edge may be a target base station. As shown in (a) of FIG. 9, the device may be connected to a 3GPP network via the source edge, the 3GPP network and the M2M service platform may have a mutual communication, and as described above, an edge instance including a network function virtualization instance and an M2M service instance may be deployed at the source edge.

Particularly, in one exemplary embodiment, it may be assumed that, when a device moves, a 3GPP network entity like SCEF or ANDSF, not the device, makes a handover decision to a target edge. As shown in (b) of FIG. 9, when a handover is determined, the handover decision may be notified to a device (S1000). In particulra, a tunnel may be set up between the source edge and the target edge for efficient data communication. A device may be configured to perform a handover (S1001) and be connected to a target edge. The handover process may be based on a conventional (general) handover process and a standard handover process suggested by 3GPP.

As illustrated in (c) of FIG. 9, a device may be separated from the source edge and may be configured to receive a service from the target edge. A network function virtualization instance transfer may be performed (S1002) indicating that a network function virtualization instance of a source edge may be copied or moved to a target edge through the tunnel that is set up. When the transfer is performed to provide services, the movement rate of a device needs to be considered to prevent the service from being interrupted and the service quality from being degraded. This process may be performed by a network functions virtualization orchestrator (NFVO) and be based on a conventional transfer process.

When the transfer of the network function virtualization instance is completed, the handover information and the handover decision may be notified to an M2M service platform (S1003), and the M2M service platform may be a oneM2M service platform. In addition, SCEF, MTC-IWF or 5G SBA APIs of the 3GPP network may be configured to notify the handover of a device to the M2M service platform. Meanwhile, although not illustrated, this process may be triggered by an MEC platform, if it exists. For example, the MEC platform may exist between a 3GPP network and an M2M service platform as shown in FIG. 8. In addition, the handover information may include information regarding the target edge and the source edge and also information regarding a third-party entity that will be described in detail below.

In one exemplary embodiment, an M2M edge instance of the source edge may be copied or moved to the target edge according to a data forwarding process. The forwarding process may be based on a conventional (general) data forwarding process including packet forwarding. This process may be included in the step S1004 of performing M2M service instance transfer of FIG. 10.

As illustrated in (d) of FIG. 9, when an edge transfer process is completed, a bearer of the source base station may be released via a path switch procedure. The source edge may be configured to improve efficiency by removing the edge instances including the M2M service instance and the network function realization instance that is previously used to provide the services to the device. Additionally, when a connection or interaction between the M2M service instance and the network function virtualization instance is present, a new connection in the target edge may be required as the edge transfer is performed. Accordingly, the connection update may be performed (S1005).

Further, the completion of the transfer of the M2M service instance may be notified to the device (S1006). Correspondingly, the device 901 may be configured to receive services associated with every edge instance and information regarding the M2M service instance from the target edge. Accordingly, an M2M service may be provisioned through the target edge, the previously transferred network function virtualization instances, and the transferred M2M service instances. For example, provisioned resources may include computing resources and storage and network resources.

Meanwhile, the step S1001, where the device performs a handover, may indicate a step of being connected to a target edge. It is illustrated as if being performed immediately after the device receives a handover decision. However, since this is merely one exemplary embodiment, it may be performed after the step S1006, that is, after the transfer of an M2M service platform instance is notified to the device.

Furthermore, in one exemplary embodiment, at least one or more third party entities may be connected to the target edge. When the third party entity intends to transfer its application entity to the target edge, the handover of a device needs to be recognized. Accordingly, as the following information needs to be so configured as to be shared with or accessible by the third party entity, the information may be shared with the third party entity in the step S1001 where the device performs a handover. However, the following information is merely one exemplary embodiment and not exhaustive.

Figure 11:
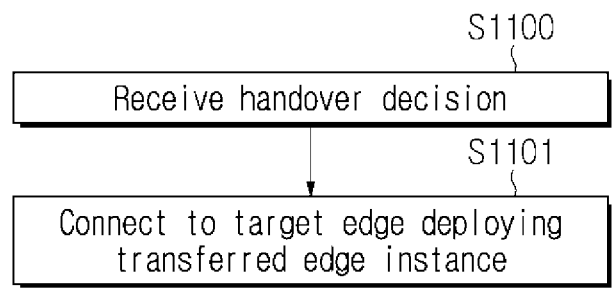

1. Whether a handover process of a device is performed;
2. Information on a source edge and a target edge;
3. Whether the target edge supports edge instance hosting at application level (the instance hosting capability of the target edge);
4. Location of a device performing a handover;
5. Information on the route of the device;
6. A route plan or expected route of the device; and
7. Network function virtualization (NFV) information in operation FIG. 11 is a view illustrating a case where edge instances are transferred in a loosely coupled edge mode in an M2M system according to the present disclosure. More particularly, FIG. 11 illustrates an edge transfer process from the perspective of an M2M terminal. In particular, the terminal may refer to a device.

In one exemplary embodiment, according to the edge transfer process illustrated in FIG. 9 and FIG. 10, as mentioned above, the source edge may have been connected to a device and accommodated (deployed) the edge instances associated with the device as early as before the handover decision is determined. As mentioned above, the edge instances may include an M2M service instance and a network function virtualization instance.

As mentioned above, in one exemplary embodiment, the edge instances may be transferred in a loosely coupled edge mode, and the device may be configured to receive a handover decision, when the handover decision is determined by an element of a 3GPP network (S1100). In addition, the edge instance of the source edge may be transferred to the target edge in the same edge transfer process as mentioned above, and the device may be connected to the target edge deploying the transferred edge instances (S1101). Particularly, for example, the source edge and the target edge may correspond to edge nodes supporting 5G according to a 3GPP standard and may follow the edge transfer process illustrated in FIG. 9 to FIG. 10.

Meanwhile, although this exemplary embodiment illustrates that the device receives a handover decision and a handover is performed after the edge transfer is completed, according to another exemplary embodiment, a handover to the target edge may also be performed before the edge transfer.

Meanwhile, according to the edge transfer process of FIG. 9 to FIG. 10, a device may be connected to a single target edge. However, in an edge transfer process that will be described with reference to FIG. 13 and FIG. 14 below, there may be a multiplicity of target edges, and the edges may be marked as a target edge and an M2M edge node for the purpose of distinction and clarity of explanation. In particular, the target edge and the M2M edge node may be different base stations, road side units, or smart building access points.

Figure 12:
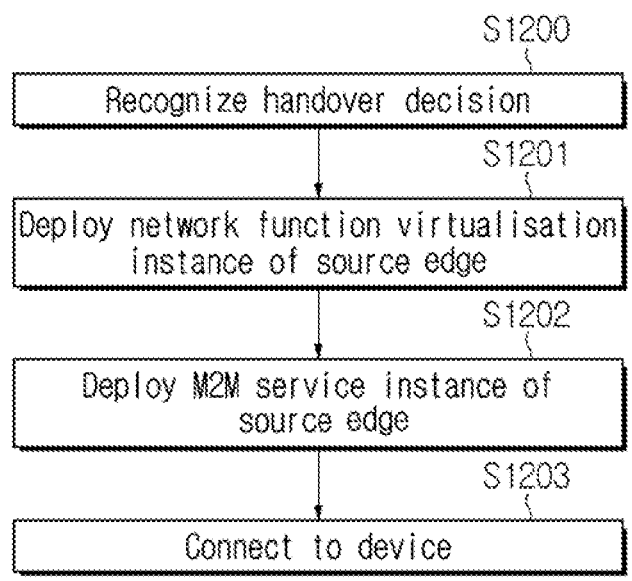

FIG. 12 is a view illustrating an edge transfer process in a loosely coupled edge mode in an M2M system according to the present disclosure. This view illustrates the edge transfer process described in FIG. 9 to FIG. 10 from the perspective of a target edge. In one exemplary embodiment, a target edge may be configured to recognize a handover decision made by the device or a 3GPP network (S1200). The decision may be recognized when a tunnel to a source edge is set up. The step of S1200 may indicate that a target edge may be configured to receive a handover decision. Alternatively, the decision may be recognized through a source edge or another 3GPP network element.

After the handover decision is recognized, the target edge may be configured to deploy (accommodate) a network function virtualization instance of the source edge by copying and pasting, or moving the instance of the source edge to the target edge through a tunnel that is set up to the source edge (S1201) and deploy an M2M service instance (S1202). This process may be the same transfer process as mentioned above.

After both the network function virtualization instance and the M2M service instance are transferred, the target edge may be configured to connect to a device for which the handover has been determined (S1203). Meanwhile, this view illustrates that a device is connected after all the edge transfer processes. However, as this is merely one exemplary embodiment, a device may be connected immediately after a handover decision is determined.

Figure 13:
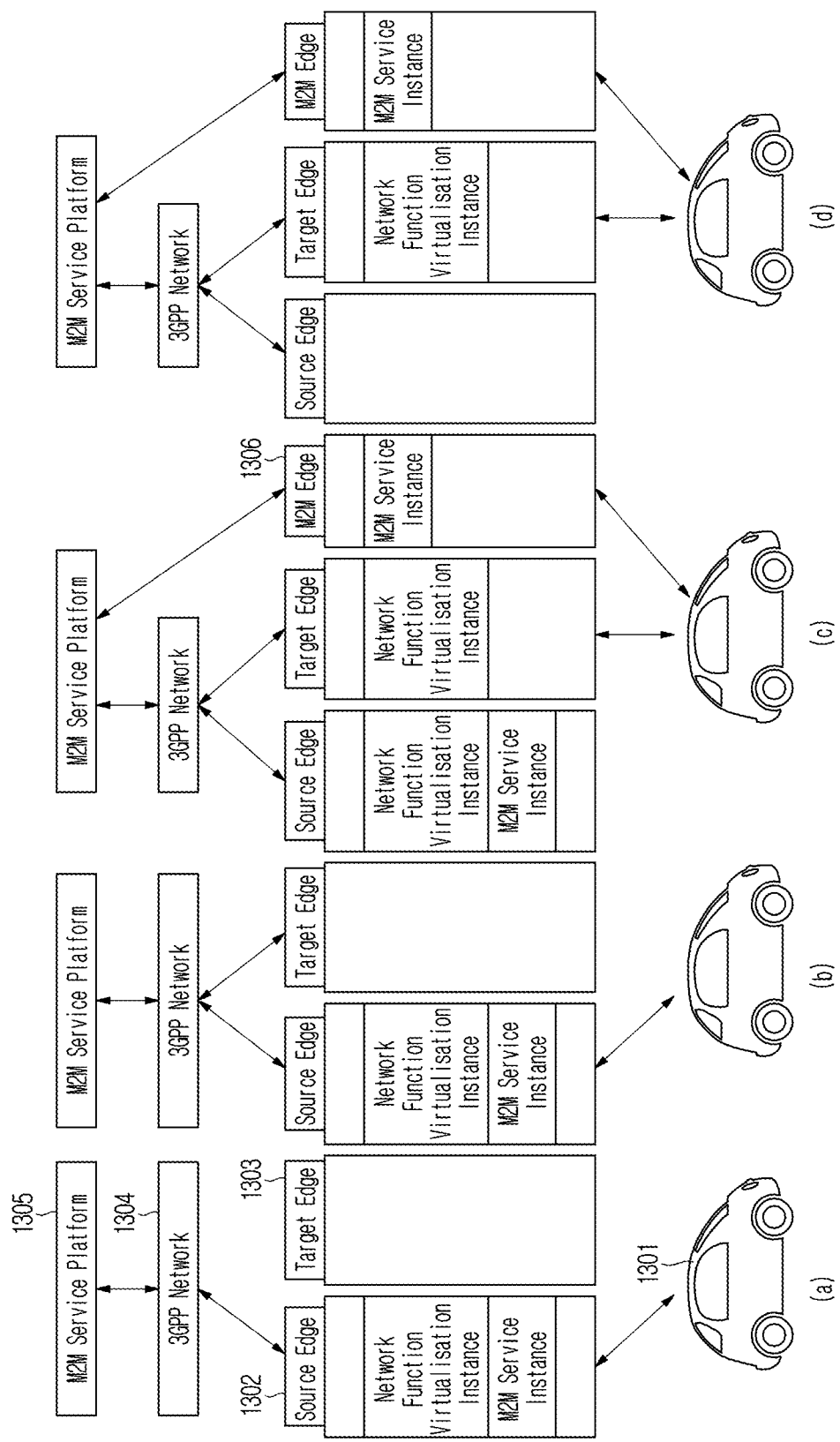
FIG. 13 is a view illustrating another edge transfer in a loosely coupled edge mode in an M2M system according to the present disclosure.
Figure 14:
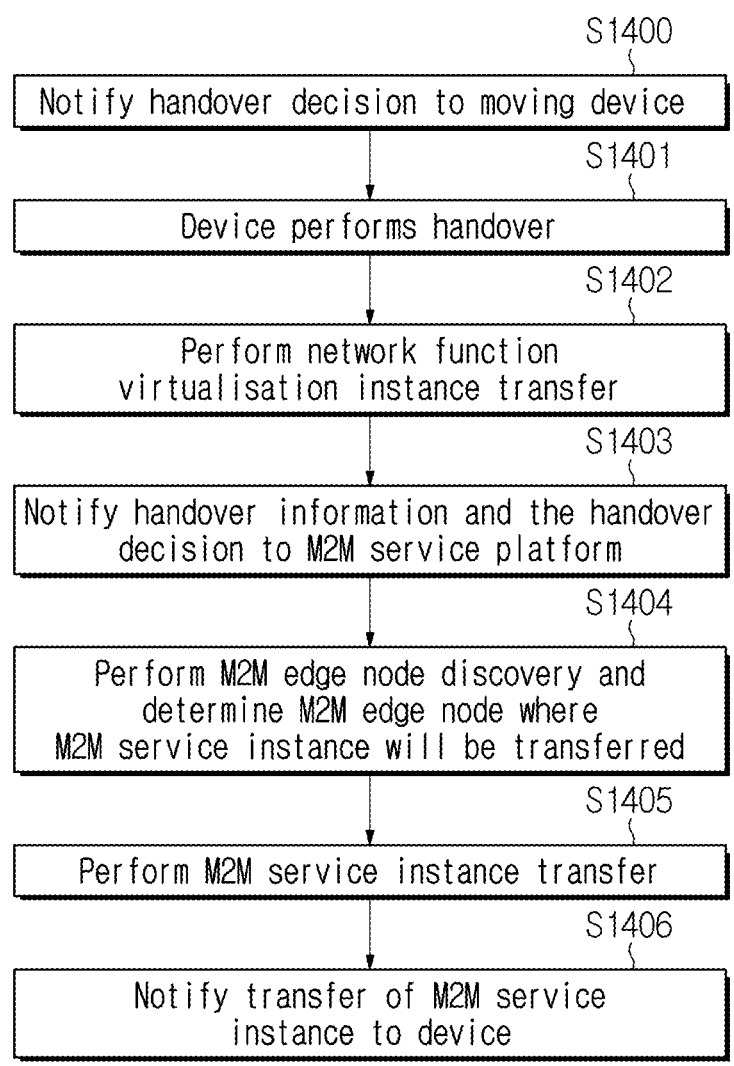
FIG. 14 is a view illustrating each step of edge transfer process in a loosely coupled edge mode in an M2M system according to the present disclosure.

FIG. 13 is a view illustrating an edge transfer process in a loosely coupled edge mode in an M2M system according to the present disclosure. FIG. 14 is a view illustrating each step of the edge transfer process. More particularly, the edge transfer process is based on a handover from a 3GPP 5G edge node to an edge node incapable of hosting the M2M service instance. In particular, the edge node incapable of hosting the M2M service instance may be a non-3GPP 5G edge node.

In one exemplary embodiment, an environment of edge transfer may include a device with mobility 1301, a source edge 1302, a target edge 1303, a 3GPP network 1304, an M2M service platform 1305, and an M2M edge 1306. In addition, the 3GPP network may include elements such as a service capability exposure function (SCEF) and a system architecture evolution gateway (SAE-GW). A source edge may be a source base station, and a target edge may be a target base station.

Unlike the loosely coupled edge mode in FIG. 9 and FIG. 10, when a target edge node is a non-3GPP 5G edge node, a most suitable edge for transferring a network function virtualization instance may be different from a most suitable edge for transferring an M2M service instance. Accordingly, an additional process may be required.

In one embodiment, according to (a) in FIG. 13, as the device 1301 moves, a network entity such as SCEF or ANDSF may be assumed to have determined a handover to the target edge 1303. Once a handover decision is determined, the decision may be transmitted to the device 1301 (S1400). Thus, the device may be configured to perform the handover (S1401) and be connected to the target edge 1303. In particular, the handover process may be based on a conventional handover process and a standard handover process suggested by 3GPP.

Further, according to (b) in FIG. 13, the device may be separated from the source edge 1302 and perform a network function virtualization instance transfer to receive a service from the target edge (S1402). To prevent the interruption of service and the degradation of service quality, an edge transfer may be performed with consideration of the movement rate of a device. The network function virtualization instance transfer may indicate that the network function virtualization instance of the source edge may be copied or moved to the target edge by a network functions virtualization orchestrator (NFVO). This process may be based on a conventional transfer process.

After the process (S1402) is completed, a notification regarding the handover information and the handover decision may be output to the M2M service platform 1305 (S1403). The M2M service platform may be an oneM2M service platform. In addition, the process may be performed by SCEF, MTC-IWF or 5G SBA APIs of the 3GPP network 1304. The handover information may include information regarding the target edge and the source edge. Moreover, it may include information regarding the above-described third party entity. Meanwhile, if an MEC platform exists as illustrated in FIG. 8, the process may be triggered by the MEC platform.

Herein, even if the target edge, to which the network function virtualization instance is transferred, has ever been selected as a most suitable target edge based on the distance to a device and the intensity of a signal, the target edge 1303 may not support M2M service instance hosting. In particular, the M2M service platform may need to determine the M2M edge node. Therefore, the M2M service platform 1305 may be configured to search for an M2M edge node and determine a most suitable M2M edge node 1306 for transferring the M2M service instance. Accordingly, the M2M service platform may be configured to perform M2M edge node discovery and determine the M2M edge node where M2M service instance will be transferred (S1404). The determination may be based on the discovery. The most suitable M2M edge node may be searched based on DNS, registry or mDNS. The M2M edge node 1306 may be a road side unit, a smart building access point, etc. However, it is not limited thereto.

As illustrated in (c) of FIG. 13, the M2M service platform may be configured to copy and paste, or move the M2M service instance of the source edge to the most suitable M2M edge node (S1405). The M2M edge node may be directly connected to the M2M service platform. The M2M service instance may include the instance that is offloaded from the M2M service platform. In particular, the offloaded instance may be the same as mentioned above.

Meanwhile, the (c) in FIG. 13 illustrates that the M2M service platform 1305 copies and transfers an M2M service instance of the source edge 1302. However, this is merely one exemplary embodiment. Accordingly, when an interface is implemented where data may be directly transmitted and received between edge nodes, a direct transfer from a source edge to a target edge node may be possible. Next, as illustrated in (d) of FIG. 13, edge instances at the source edge may be removed, and the transfer of M2M service instance may be notified to the device (S1406). Information regarding the updated M2M service platform and the M2M service instance may be transmitted to the device.

Meanwhile, if the target edge, to which the network function virtualization instance is transferred, supports M2M service instance hosting, the M2M edge node may be the same as the target edge indicating that the M2M edge node may be the target edge. In particular, the same process as illustrated in FIG. 9 to FIG. 10 may be performed by transferring the M2M service instance to the target edge.

Meanwhile, when the exemplary embodiment is described, the M2M edge node and the target edge are illustrated to be connected to different base stations. However, the M2M edge node and the target edge are not limited thereto, since they may be wirelessly connected to the same base station according to another exemplary embodiment.

Figure 15:
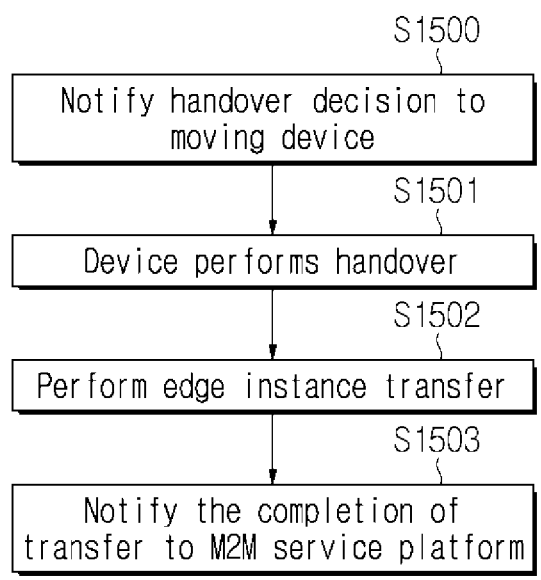
FIG. 15 is a view illustrating each step of edge transfer process in the tightly coupled edge mode of an M2M system according to the present disclosure.

FIG. 15 is a view illustrating each step of edge transfer process in the tightly coupled edge mode of an M2M system according to the present disclosure. More particularly, FIG. 15 is a view illustrating that edge instance of a source edge are non-independently transferred to a target edge. In one exemplary embodiment, it may be assumed that a 3GPP network recognizes information regarding a third party entity and the source edge and the target edge are capable of managing all the edge instances and the edge instances may be the same as mentioned above.

In one exemplary embodiment, a 3GPP network may be configured to determine a handover of device and output a notification regarding the handover to a moving device (S1500). Accordingly, the device may be configured to perform handover (S1501) and may be separated from the source edge and connected to the target edge. When the edge instances are transferred in a tightly coupled edge mode, every edge instance including an M2M service instance and a network function virtualization instance may be transferred to the target edge at a time (S1502). This process may be performed simultaneously. In addition, the source edge and the target edge may correspond to edge nodes including different 3GPP 5G base stations. When the edge transfer is completed, a notification regarding the completion may be output to or shared with each corresponding platform and network (S1503). For example, the completion of transfer may be notified to the M2M service platform or the MEC platform. Thus, the device may stably receive the services from the target edge, even when the handover occurs.

Figure 16:
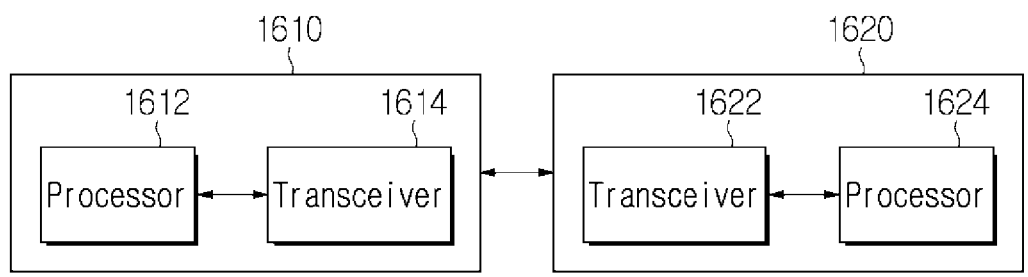
FIG. 16 is a view illustrating an M2M apparatus of an M2M system according to the present disclosure.

FIG. 16 is a view illustrating a configuration of M2M devices in an M2M system according to the present disclosure. The M2M device 1610 or the M2M device 1620 illustrated in FIG. 16 may be understood as hardware functioning as at least one among the above-described AE, CSE and NSE.

Referring to FIG. 16, the M2M device 1610 may include the processor 1612 configured to operate a device and the transceiver 1614 configured to transmit and receive a signal. In particular, the processor 1612 may be configured to operate the transceiver 1614. In addition, the M2M device 1210 may be configured to perform a communication with another M2M device 1620. Another M2M device 1620 may also include the processor 1624 and the transceiver 1622, and the processor 1624 and the transceiver 1622 may be configured to perform the same function as the processor 1612 and the transceiver 1614.

For example, the originator and the receiver, which are described above, may be one of the M2M devices 1610 and 1620 of FIG. 16, respectively. In addition, the devices 1610 and 1620 of FIG. 16 may be different devices. For example, the devices 1610 and 1620 of FIG. 16 may be communication devices, vehicles or base stations. In other words, the devices 1610 and 1620 of FIG. 16 refer to devices, configured to perform a communication, and are not limited to the above-described exemplary embodiments.

Effects obtained in the present disclosure are not limited to the above-mentioned effect, and other effects not mentioned above may be clearly understood by those skilled in the art from the following description.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

The above-described exemplary embodiments of the present invention may be implemented by various means. For example, the embodiments of the present invention may be implemented by hardware, firmware, software, non-transitory computer-readable medium on which a software or command is stored and executable on a device or a computer, or a combination thereof.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. An M2M apparatus in a machine-to-machine (M2M) system, comprising:
   a transceiver configured to transmit and receive data; and
   a processor configured to operate the transceiver,
   wherein, when a handover of a device occurs, the processor is configured to receive handover information including information regarding a source edge node and a target edge node,
   wherein, when a network function virtualization instance of a source edge node is transferred to a target edge node incapable of hosting an M2M service instance, the processor is configured to search for an M2M edge node for transferring the M2M service instance independently from the network function virtualization instance to the M2M edge node, and
   wherein the M2M edge node is different from the target edge node.

2. The apparatus of claim 1, wherein, when the M2M service instance is transferred, a connection between the M2M service instance and the network function virtualization instance is updated.

3. The apparatus of claim 2, wherein information on the transfer of an edge instance and the updated connection is recorded on a resource <modifiedResource>.

4. The apparatus of claim 1, wherein the M2M edge node is a road side unit or a smart building access point.

5. The apparatus of claim 1, wherein the search is performed based on at least one of DNS, registry and mDNS.

6. The apparatus of claim 1, wherein the handover information includes at least one of information regarding the source edge and the target edge, a location of a device, a path of the device and a predicted path, and instance hosting capability of the target edge.

7. The apparatus of claim 1, wherein the M2M service instance includes an offloaded instance.

8. A method of transferring an M2M service in a machine-to-machine (M2M) system, comprising:
   receiving handover information including information regarding a source edge node and a target edge node, when a handover of a device occurs, and
   searching for an M2M edge node for transferring an M2M service instance when a network function virtualization instance of the source edge node is transferred to the target edge node incapable of hosting the M2M service instance, and
   transferring the M2M service instance to the M2M edge node independently from the network function virtualization instance, wherein the M2M edge node is different from the target edge node.

* * * * *